United States Patent
Garcia Zuazo et al.

(10) Patent No.: US 11,623,752 B2
(45) Date of Patent: Apr. 11, 2023

(54) AIRCRAFT INSTALLATION FOR SUPPLYING PRESSURIZED AIR

(71) Applicant: Airbus Operations S.L., Getafe (ES)

(72) Inventors: Angel Garcia Zuazo, Getafe (ES); Serafin Escudero Fraile, Getafe (ES); Esteban Martino-Gonzalez, Getafe (ES); Juan Tomas Prieto Padilla, Getafe (ES); Diego Barron Vega, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 278 days.

(21) Appl. No.: 16/916,549

(22) Filed: Jun. 30, 2020

(65) Prior Publication Data

US 2021/0001990 A1 Jan. 7, 2021

(30) Foreign Application Priority Data

Jul. 1, 2019 (EP) .................................... 19382560

(51) Int. Cl.
| | |
|---|---|
| *B64D 13/06* | (2006.01) |
| *B64D 13/02* | (2006.01) |
| *B64D 13/08* | (2006.01) |
| *F02C 6/04* | (2006.01) |
| *F02C 6/08* | (2006.01) |
| *F02C 7/18* | (2006.01) |
| *B64D 27/12* | (2006.01) |
| *B64D 41/00* | (2006.01) |

(52) U.S. Cl.
CPC ............ *B64D 13/02* (2013.01); *B64D 13/06* (2013.01); *B64D 13/08* (2013.01); *F02C 6/04* (2013.01); *F02C 6/08* (2013.01); *F02C 7/18* (2013.01); *B64D 27/12* (2013.01); *B64D 41/007* (2013.01); *B64D 2013/0618* (2013.01)

(58) Field of Classification Search
None
See application file for complete search history.

(56) References Cited

U.S. PATENT DOCUMENTS

| | | | | |
|---|---|---|---|---|
| 6,928,827 | B2* | 8/2005 | Zaple ...................... | B64D 13/04 62/170 |
| 7,624,944 | B2* | 12/2009 | Parikh .................... | B64D 13/06 137/15.1 |
| 2009/0094989 | A1* | 4/2009 | Kraft ........................ | F02K 3/06 60/725 |
| 2013/0040545 | A1* | 2/2013 | Finney ................... | B64D 13/06 454/71 |

(Continued)

OTHER PUBLICATIONS

European Search Report; priority document.

*Primary Examiner* — Kayla Mccaffrey
(74) *Attorney, Agent, or Firm* — Greer, Burns & Crain, Ltd.

(57) ABSTRACT

An aircraft installation of a pneumatic system of an aircraft with different compressed air sources for supplying pressurized air to air consumer equipment. Either an air bleed system, electrical compressors, or a combination thereof may perform such supplying of compressed air depending on the aircraft operation condition, for instance the flight altitude or specific flight phases. Also, a turbofan engine, and a method for supplying compressed air to air consumer equipment are disclosed.

12 Claims, 9 Drawing Sheets

(56) References Cited

U.S. PATENT DOCUMENTS

| | | | |
|---|---|---|---|
| 2014/0000279 A1* | 1/2014 | Brousseau | F02C 7/00 |
| | | | 60/785 |
| 2017/0008633 A1 | 1/2017 | Parmentier et al. | |
| 2017/0190430 A1* | 7/2017 | Casado Montero | B64D 13/06 |
| 2018/0371991 A1* | 12/2018 | Castillo De Alvear | ...... |
| | | | B64D 15/04 |
| 2020/0247548 A1* | 8/2020 | Fagundes | B64D 13/00 |

* cited by examiner

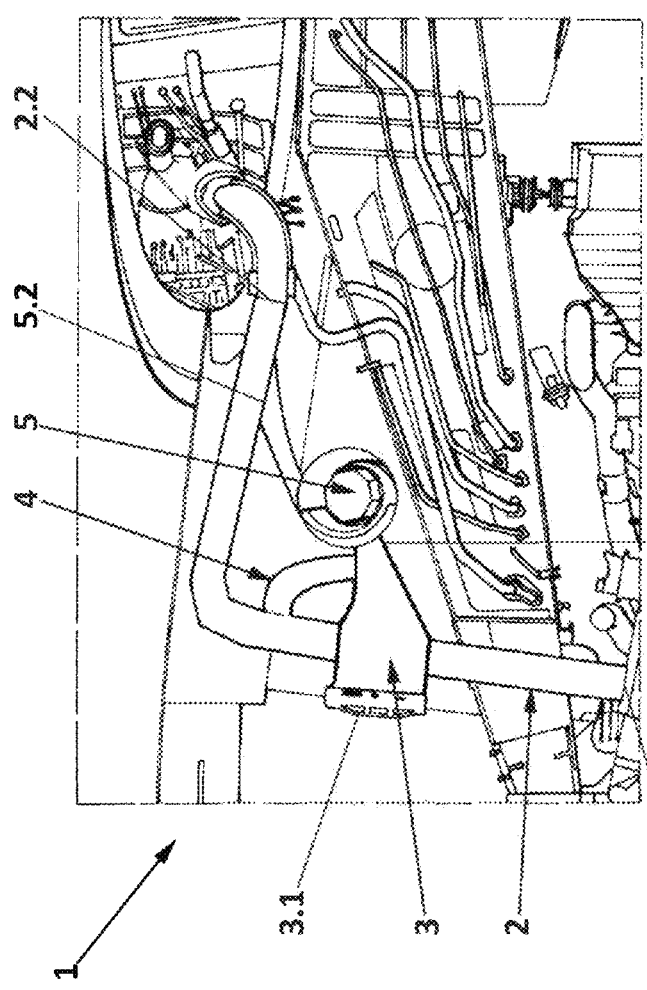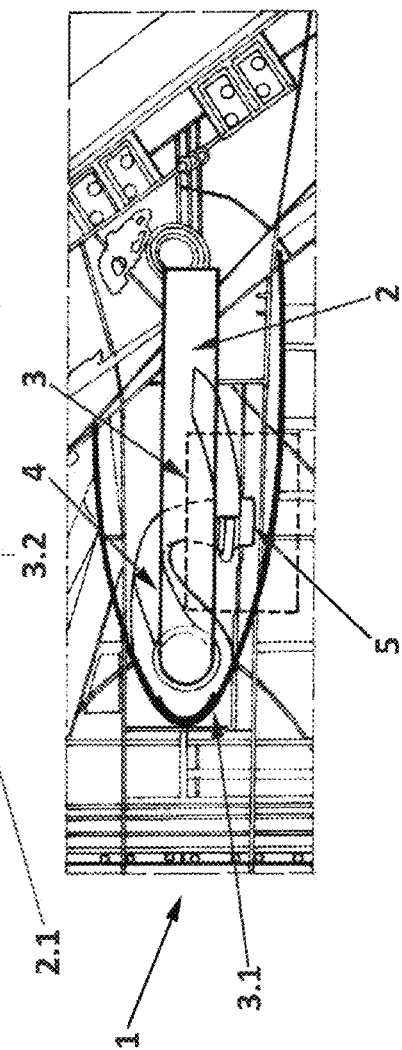

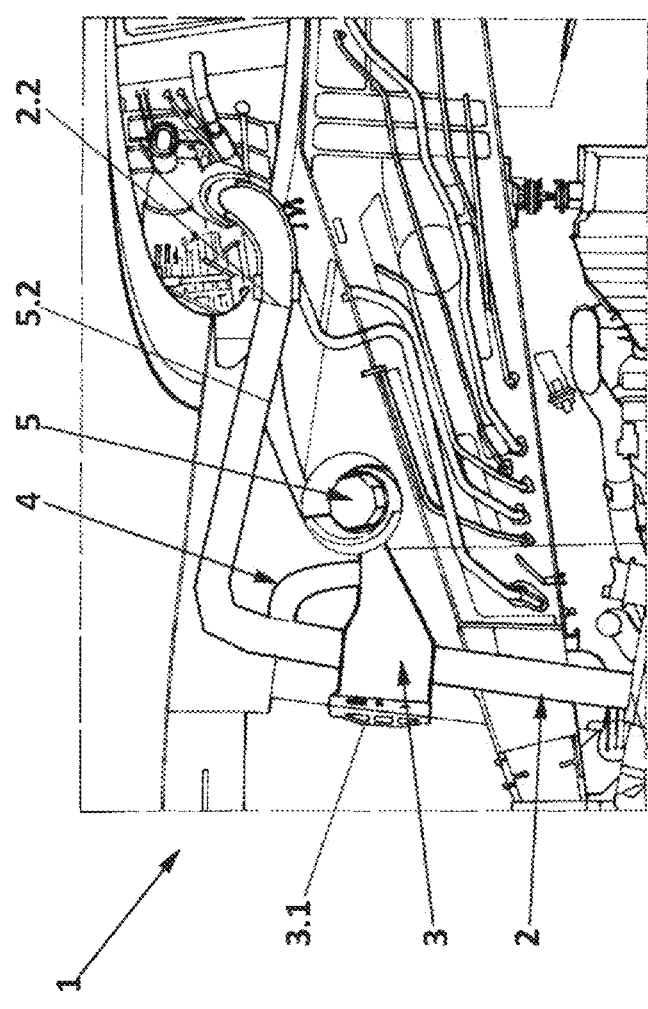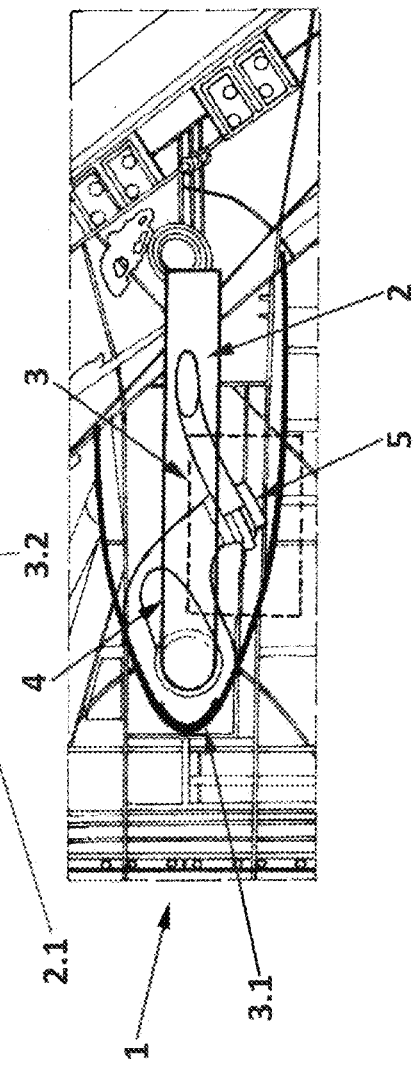

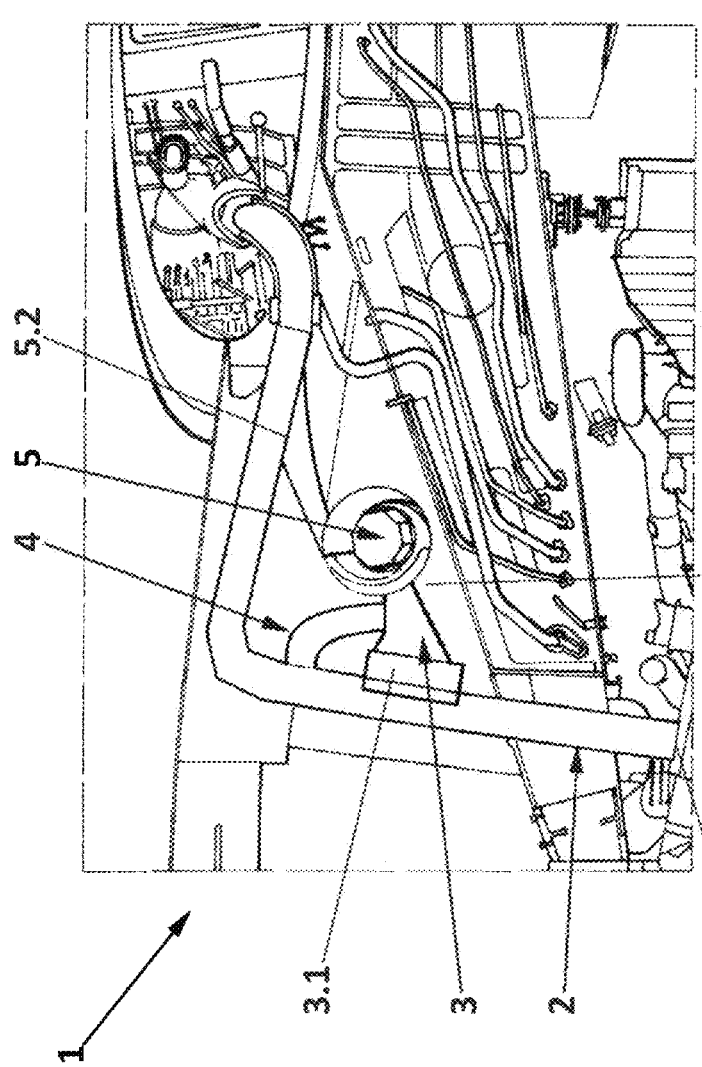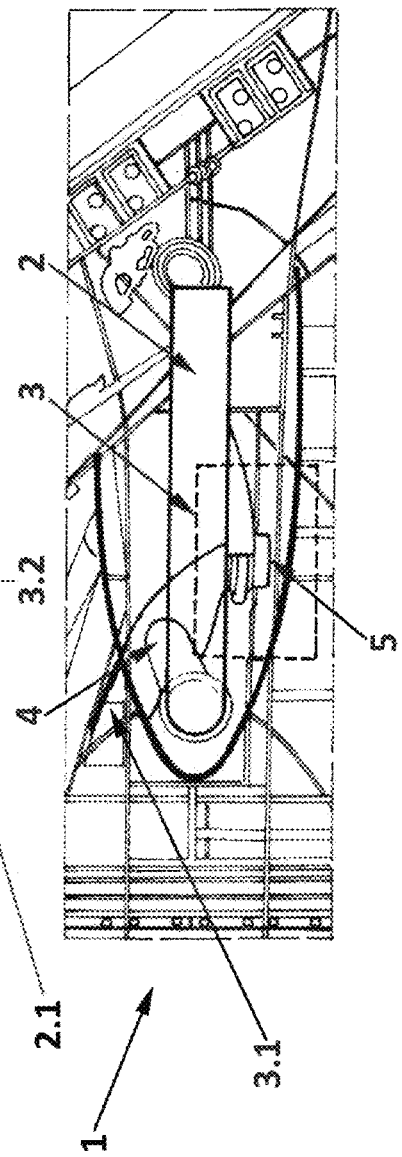

AIRCRAFT INSTALLATION FOR SUPPLYING PRESSURIZED AIR

CROSS-REFERENCES TO RELATED APPLICATIONS

This application claims the benefit of the European patent application No. 19382560.1 filed on Jul. 1, 2019, the entire disclosures of which are incorporated herein by way of reference.

FIELD OF THE INVENTION

The present invention belongs to the field of air distribution or pneumatic systems in aircraft, and particularly, it relates to the provision of optimized compressed air sources for supplying pressurized air to air consumer equipment.

In particular, either an air bleed system, electrical compressors, or a combination thereof may perform such supplying of compressed air depending on the aircraft operation condition, for instance the flight altitude or specific flight phases.

Thus, taking into account flight parameters, specific compressed air sources optimally and selectively feed the air consumer equipment according to the actual air requirement thereof. Current pneumatic installation oversizings are therefore avoided along with energy loss minimizing when operating in non-optimized scenarios.

An aircraft installation, which allows the proper arrangement of such optimized compressed air sources within the pylon of an aircraft, is herein provided.

BACKGROUND OF THE INVENTION

In gas turbine engines, air is normally taken from compressor stages upstream of the fuel-burning chamber(s). Thus, this bleed air is at high temperature and high pressure, wherein typical values are comprised in the range 150-500° C. when extracted from the engine, and in the range 150-250° C. after regulation in a pre-cooler; and 40 psig, respectively.

Once taken, this bleed air is channeled from the compressor stages of the engine to various locations within the aircraft by a pneumatic system comprising, in turn, a network of ducts, valves and regulators. Consequently, such channeling means are to be adapted to withstand the high temperature and pressure of the bleed air.

Because of its high temperature and pressure, this bleeding air is used to operate air consumer equipment such as the Air Cycle Machines of the Environmental Control System (ECS), the Wing Anti-Ice system (WAIS) and other minor air consumers. Depending on the air consumer requirements to be fed, a wide range of pressure and temperature may be needed which entails different energy cost, for instance:

air conditioning (i.e., ECS) is driven by the available pressure, and

WAIS is driven by available temperature.

Classic architectures of air bleed systems extract bleed air from the gas turbine compressor at two different stages via respective ports. One of these ports is located at a low-intermediate compressor stage (the so-called Intermediate Port, 'IP') while the second port is located at an intermediate-high compressor stage (the so-called High Port, 'HP') to allow extracting the bleed air at two different conditions.

Typical values of bleed air extracted from each of these ports are:

Intermediate Port, 'IP': pressure from 10 psig ('idling') to 180 psig (maximum take-off thrust, 'MTO'), while temperature is between 80 C° and 400° C.

High Port, 'HP': pressure from 30 psig ('idling') to 650 psig ('MTO'), while temperature is between 150° C. and 650° C.

It is to be noted that the exact value of pressure and temperature of the air bled depends on the engine speed. Similarly, although only two conventional ports have been discussed herein (IP and HP), the High Pressure Port, 'HP', may be formed by more than one port (normally two ports) all located at intermediate-high compressor stages, different from the Intermediate Pressure Port, 'IP'.

Hereinafter, for illustrative purposes the possible ports (one or more) forming part of the High Pressure Port will be discussed in conjunction as 'HP'.

Under some circumstances, the channeling means may undergo an unexpected loss of bleed air, the so-called leakages, which could potentially lead to problems when operating the aircraft. Due to its inherent effect in the overall performance, detection means should be installed along the entire route of the channels. Eutectic salt-based sensors are widespread used in the industry as overheat detection sensors for sensing bleed air leakages throughout the ducting.

It is well known in the current practice that pneumatic systems need to install fail-safe architectures such as disperse shut-off valves in order to isolate the different aircraft zones for integrity assurance once ducting leakage is detected. Nevertheless, aircraft vibration may induce rattling on these sensors, which might cause spurious leakage detection alerts and unnecessarily isolation. Besides, spurious faults trigger maintenance actions for leakage localization.

Furthermore, from on-ground to in-flight, external air conditions (i.e., 'ambient air') drastically change. This need to be compensate by the onboard pneumatic system by regulating the air bleeding from each of the two ports (IP or HP). Hence, the overall pneumatic system (which exclusively rely on bleed air) must be sized to operate at any planned flight phase, involving a significant energy loss during take-off/climb and descent/holding phases. Specific details of this energy loss can be seen in FIG. 1.

With the advent of new aircraft models (specifically those Ultra-High By-Pass Ratio engines that provide higher HP port temperatures with lower FAN port pressures), the above problems stress.

Consequently, in view of the significant energy loss during certain flight phases and the safety risks involved by current solutions, there is a need in the aerospace industry for a pneumatic system that satisfies air consumers requirements with the optimum energy extracted from the gas turbine engines.

SUMMARY OF THE INVENTION

The present invention provides a solution for the aforementioned problems.

In a first inventive aspect, the invention provides an aircraft installation for supplying pressurized air to an air consumer equipment of the aircraft, the aircraft installation comprising:

a gas turbine engine having a single port located at a low-intermediate compressor stage of such gas turbine engine;

a bleed duct, at one end in fluid communication with the single port of the gas turbine engine, and at opposite end in fluid communication with the air consumer equipment;

a cooling duct comprising an inlet by which cooling air enters into the cooling duct, and an outlet;

a branch duct in fluid communication with the bleed duct and configured to divert a portion of the bleed air from the bleed duct into the outlet of the cooling duct; and an electrical compressor with an intake and an outlet, so that the intake is in fluid communication with the outlet of the cooling duct after the joining with the branch duct, and the outlet is in fluid communication with the opposite end of the bleed duct which is communicated with the air consumer equipment.

The bleed duct defined above forms part of an air bleed system configured to convey compressed air from a particular location within a gas turbine engine compressor (i.e., at a particular compressor stage) for different uses. The temperature and pressure of the air is variable dependent upon the compressor stage at which air is extracted (i.e., air is bled).

In particular, the air bleed system according to the invention comprises a single port configured to extract air from the compressor stage where it is located.

The present invention further envisages the presence of an electrical compressor whose intake is in fluid communication with the outlet of the cooling duct. Since this cooling duct outlet is located after the point where the branch duct diverted from bleed duct joins, it is also possible to supply air to the electrical compressor by bleed air.

As air passes to the electrical compressor, this air is pressurized and finally returned to the original bleed duct which is communicated with the air consumer intended to be fed. In use, a rotating component imparts kinetic energy to the incoming air which is eventually converted into pressure energy, i.e., compressed air.

Therefore, the ducting of the present aircraft installation provides different ways to supply pressurized air to air consumers of the aircraft.

For instance, the pressurized air may directly come from the bleed air extracted from the gas turbine engine by the single port at the particular compressor stage. It is to be noted that this single port is preferably located at a low-intermediate compressor stage of the gas turbine engine, the so-called 'IP port'.

Alternatively, air extracted by the single port and conveyed by the bleed duct may be redirected or diverted (partially or in whole) towards the electrical compressor intake via the branch duct. Then, once compressed therein, pressurized air is returned to the original bleed duct towards the air consumers intended to be fed.

It is to be noted that the branch duct may also take the form of an orifice, a chamber, or the like, as long as it provides a suitable fluid communication between the bleed duct and the cooling duct just before the electrical compressor intake.

Besides, a third way comprises supplying the cooling air taken and conveyed by the cooling duct directly to the electrical compressor intake. As before, once air passes the electrical compressor, pressurized air is returned to the bleed duct towards the air consumers intended to be fed.

In operation, that is, the aircraft being either on-ground or in-flight, air with particular pressure, density and temperature surrounds the aircraft ('ambient air'). This mainly depends on the flight altitude or even the flight phase, where air with different properties enters the gas turbine engine and is furthermore affected by the compressor compression.

For a given gas turbine engine, air properties at each compressor stage may be predicted using compressor map, for instance, both at design and off-design conditions.

Conventional pneumatic systems relied exclusively on air bleed systems to regulate and mix air extracted from the two ports, i.e., IP and HP, to meet the particular requirements of the air consumers, that is, depending on the flight conditions. Unlike this, the present invention provides a hybrid solution that compensates a deletion of the HP port (high-pressure port) with electrical compressors.

For instance, high energy-demanding flight phases of the aircraft encompasses on-ground operation (e.g., taxiing), take-off, or even the first portion of climbing, as well as other phases like descent (or approaching) and holding. Conventionally, in these above energy-demanding flight phases, which represents a little portion of the overall flight, most of bleed air came from the HP since the pressure delivered by the IP port is not sufficient to meet the pressure requirements from the air consumers, which is why the IP port is not used for pressure-related purposes For instance, at 'holding' phase where the engine is idling the IP port is not capable of extracting the bleed air with sufficient pressure, so if energy-demand further increases, it may be necessary to raise the idle, which in turn entails fuel consumption. On the other hand, if air is bled from IP in those phases where the engine is at maximum power such as take-off, the engine should be sized for more power and therefore would be larger.

As mentioned, using electric compressors (possibly along with batteries) it is possible to accumulate and deliver electricity at the required moment and optimize the size and fuel consumption of the engine.

That is, the present aircraft installation comprises different routes to the air already compressed, i.e., bleed air, or intended to be further compressed by the electrical compressor that will feed the air consumers afterwards.

Accordingly, the electrical compressor(s) is/are configured to adapt the pressure delivered to the pressure required by the air consumer, or in other words, the electrical compressor(s) is/are configured to adapt the supplied compressed air according to the flight phase and/or altitude.

Consequently, the conventional HP ducting is deleted. Further, in the absence of an HP bleed source, energy peaks demanded by air consumers are mainly offset by the electrical compressors.

In addition, the remaining single port (i.e., 'IP port') may be slightly moved forwards or backwards to optimize the air management system operation at the remaining flight phases (e.g., cruise), which entail the majority of the flight.

As mentioned, deletion of HP port involves the deletion of the HP ducting. Since the remaining IP ducting does not convey such a high-pressure and temperature air, there is no need for the related fail-safe equipment such as sensors, valves (e.g., High Pressure Valve, HPV, or Over Pressure Valve, OVP), etc.

Furthermore, the Overheat Detection System will be drastically shortened as there is no need to detect leakages in the APU (Auxiliary Power Unit) ducting, nor in the ducting which connect to Wing Anti-ice System (WAIS), because these ductings are no longer present in some embodiments.

Therefore, a collateral advantage of the invention is that operational safety is enhanced while reliability improved, that is, there is a less tendency to spurious or real faults triggered by bleed leakages as the ducting length is shortened.

In addition, the present aircraft installation advantageously affects the overall aircraft performance in that there is a fuel burn benefit of around 1% Thrust-specific fuel consumption, 'SFC', in a typical short-range aircraft 800 nm (nautical miles) mission profile.

This fuel saving is achieved due to a substantial weight reduction due to HP ducting deletion, OPV and HPV deletion and total deletion or large size reduction of the pre-cooler; as well as complete deletion of the APU bleed ducting with the associated OHDS.

In this particular embodiment, the inlet of the cooling duct is an air scoop arranged so as to substantially face the incoming cooling air entering into the cooling duct.

That is, the inlet of the cooling duct (e.g., the air scoop) is immersed in a cold air stream thus experiencing the direct action of this stream of cooling air. The air scoop has a plane substantially perpendicular to the incoming streamlines of the cooling air.

When the cooling duct inlet is an air scoop, it is particularly advantageous because it allows a regulating valve to be positioned between the scoop and the pre-cooler, so that the temperature of the current of cooled hot air can be regulated, at least in part, by adjusting the intake of cold air into the pre-cooler.

In a particular embodiment, the inlet of the cooling duct is an air scoop arranged so as to be angled relative to the incoming cooling air.

In a particular embodiment, the intake of the electrical compressor is connected to the outlet of the cooling duct after the joining of the branch duct by a substantially 90° elbow.

The 90° elbow increases space availability to arrange the electrical compressor. In addition, the electrical compressor outlet may be properly aligned with the bleed duct (at its opposite end) to reduce energy loss of air mixing.

In an alternative embodiment, the intake of the electrical compressor is connected to the outlet of the cooling duct after the joining of the branch duct by a substantially 45° elbow.

Advantageously, the 45° elbow has lower pressure drop.

Pressure drop is defined as the difference in total pressure between two points of the fluid carrying duct.

In a particular embodiment, the aircraft installation further comprises:
a set of valves comprising:
a first valve arranged in the cooling duct;
a second valve arranged in the bleed duct between the opening for diverting air to the branch duct and the outlet;
a third valve arranged in the bleed duct to let the air consumers be fed directly with bleed air without passing through the electrical compressor; and
a control unit configured to receive an input relative to the aircraft operation condition and to operate such first and/or second valve and/or third valve, and/or electrical compressor based on the received input.

An aircraft operation condition can be easily determined by the aircraft itself according to different sensors and electronics installed thereon, the 'ambient air' being different for each flight scenario.

Then, the aircraft electronics sends such aircraft operation condition to the control unit of the present invention which processes it and determines which compressed air source needs to be operated based on current aircraft operation.

Thus, based on such aircraft operation condition ('input') received, the control unit selectively operates the air bleed system and/or the electrical compressor via a set of valves (already present or newly introduced) or directly via the electrical compressor (by an electrical signal)

In a preferred embodiment, the control unit is configured to selectively operate the set of valves depending on the received input, such that:

in taxiing and taking-off, the electrical compressor is fed only with cooling air from the cooling duct, so that the electrical compressor exclusively supplies compressed air to the air consumer equipment;

in climbing, the electrical compressor is fed only with cooling air from the cooling duct up to a pre-determined altitude, being the pre-determined altitude, preferably 15000 ft; then, the air consumer equipment is directly fed by bleed air from the bleed duct (that is, without passing through the electrical compressors);

in cruise, the air consumer equipment is directly fed by bleed air from the bleed duct (that is, without passing through the electrical compressors); and in descending and holding above the pre-determined altitude, the electrical compressor is fed only with bleed air from the bleed duct, so that the electrical compressor exclusively supplies compressed air to the air consumer equipment; and in approaching and landing, the electrical compressor is fed only with cooling air from the cooling duct, so that the electrical compressor exclusively supplies compressed air to the air consumer equipment.

Briefly, the aircraft installation takes benefit of:
the efficiency of the gas turbine engine to provide pressurized air during cruise (or above a certain flight altitude or flight level) with minimum energy loss, and
the efficiency of the electrical compressor(s) during ground, early climbing and descent which permit to adapt the pressure delivered by the compressor to the pressure required. Further, depending on actual 'ambient air' and regarding air consumer requirements, electrical compressors are fed either by cooling air, bleed air, or a combination thereof.

For instance, a particular operation of the set of valves to selectively supply compressed air to the air consumer equipment via any of the above ways is as follows:

If the electrical compressor is fed only with cooling air from the cooling duct (i.e., the electrical compressor exclusively supplying compressed air to the air consumer equipment), the first valve at the cooling duct inlet is opened; the second valve at the bleed duct to feed the electrical compressor is closed; and the third valve let the air consumers be fed directly with bleed air without passing through the compressor is closed.

If the electrical compressor is fed only with bleed air from the bleed duct (i.e., the electrical compressor exclusively supplying compressed air to the air consumer equipment), the first valve at the cooling duct inlet is closed; the second valve at the bleed duct to feed the electrical compressor is opened; and the third valve is closed.

If the air consumer equipment is directly fed by bleed air from the bleed duct, the first valve at the cooling duct inlet is closed; the second valve at the bleed duct to feed the electrical compressor is closed; and the third valve the third valve let the air consumers be fed directly with bleed air is opened.

The bleed air extracted by the single port located at the low-intermediate compressor stage suffices to meet the air consumer requirements during long-term flight phases such as cruise. Accordingly, the air bleed ducting (and associated valves and regulators) may be sized mainly accounting for cruise phase flight conditions, therefore optimizing their size, weight and performance.

In a particular embodiment, the aircraft installation further comprises an energy storage device configured to supply power to the at least one electrical compressor, such as a battery.

Advantageously, it is not necessary to size the turbofan engine at the point requiring maximum energy extraction, as generated energy may be accumulated in part to be used later on in a lower demand.

In a second inventive aspect, the invention provides a turbofan engine comprising:

a nacelle, and a fairing arranged internally to such nacelle for covering a gas turbine engine, a fan positioned in the foremost part of the nacelle and connected to the gas turbine engine by a shaft, wherein the fan extends up to the diameter of the nacelle; so that a secondary zone is formed between the nacelle and the fairing for passing cooling air from the fan;

a pylon for hanging the entire bypass gas turbine engine from a wing of an aircraft; and an aircraft installation according to any of the embodiments of the first inventive aspect for supplying pressurized air to an air consumer equipment of the aircraft.

Turbofan engines ingest the incoming air by the frontal area of the fan. Then, this incoming air is diverted into two principal flows:

a main path (so-called primary flow stream) which enters the compressor of the gas turbine engine and runs throughout all sections such as combustion chambers, turbines, and exhausts; and a secondary flow stream kept between the nacelle and the fairing.

Therefore, the secondary flow undergoes a slightly compression induced by the fan.

Particularly, the aircraft installation is installed in the pylon. The pylon comprises upper and lower pylon bifurcations for connecting the internal nacelle fairing with the external nacelle. These pylon bifurcations are arranged radially at opposite sides of the gas turbine engine.

Furthermore, the pylon is covered by an upper fairing between the external nacelle and the wing.

In some particular embodiments, bleed air taken from the gas turbine engine may be significantly cooled down before being used by some applications. To do this, a pre-cooler as defined above is provided, in which the hot air bled from a particular compressor stage of the gas turbine engine is cooled by cooling air from the fan duct.

Further, during this possible heat exchange process, not only the hot bleed air is cooled down by the cooling air of the cooling duct, but also this cooling air is heated up by the hot bleed air. Such warmed cooling air is therefore discharged to the electrical compressor as defined hereinbefore.

In a particular embodiment, the inlet of the cooling duct is arranged at the foremost part of a pylon bifurcation within the secondary zone formed between the nacelle and the fairing so that the cooling air entering the cooling duct comes from the fan.

Since the fan blades redirect and homogenize the flow when entering the secondary zone, the arrangement of the cooling duct at the foremost part of the bifurcation pylon optimizes the ingestion of cooling air into the cooling duct.

In an alternative embodiment, the inlet of the cooling duct is arranged at a lateral side of the pylon (that is, angled) within the secondary zone so that the cooling duct circumvents the bleed duct. In other words, the inlet of the cooling duct is arranged angled relative to the incoming cooling air on a pylon bifurcation within the secondary zone.

In a particular embodiment, the inlet of the cooling duct is arranged on a portion of a peripheral ring of the fairing so that the cooling air entering the cooling duct comes from the fan.

Therefore, the intake can be located at a suitable place of the fairing where incoming cooling airflow fits, in path and properties, the needed one depending on aircraft operation condition as explained above.

In a particular embodiment, the inlet of the cooling duct is arranged on the nacelle by a ram air intake.

In particular, inlet of the cooling duct can be arranged either on the external nacelle or the upper pylon fairing which forms part therein. Nevertheless, due to its exposure, local flow direction is very sensitive to aircraft angle of attack.

In a particular embodiment, being the pylon covered by the upper fairing, the inlet of the cooling duct is arranged on such upper fairing by a ram air intake.

In a third inventive aspect, the invention provides an aircraft comprising at least one turbofan according to any of any of the embodiments of the second inventive aspect.

In a preferred embodiment, the aircraft further comprises a vapor cycle machine in an Environmental Control System (ECS) as an air consumer equipment.

Advantageously, vapor cycle machine pack(s) require lower pressure to operate, which better fits with the pressure delivered by the electrical compressor.

Furthermore, IP port may be reduced by 2 or 3 stages in comparison with conventional IP ports due lower pressure requirement of Vapor Cycle Machine packs during cruise conditions which further improves 'SFC' benefit above 1% in a typical short-range aircraft.

Similarly, other designs adequate to operate at lower pressure may be envisaged within the present invention.

Examples of other air consumer equipment may be one of the following:

environmental control system with Air Cycle Machine pack or vapor cycle machine packs;
fuel tank inerting system;
wing anti-ice system (WAIS);
engine starting system;
water and waste; and/or
hydraulic reservoirs pressurization.

In a particular embodiment, the wing anti-ice system is electro-thermal (so-called ETIPS).

Through compressor stages, temperature increases linearly. Therefore, bleed air from the HP port was mainly used for high temperature-related purposes.

Alternatively, use of electro-mechanical WAIS (so-called EMIPS) permits a further reduction of the power consumption vs. electro-thermal WAIS (ETIPS) providing an optimum solution at aircraft level in terms of energy saving.

Briefly, electro-mechanical WAIS uses a mechanical force to knock the ice off the flight surface (e.g., the wing).

In the present aircraft installation, maximum extracted flow per gas turbine engine (via single port) is significantly lower since electrical WAIS (either electro-thermal or electro-mechanical) does not require such a compressed air.

In a fourth inventive aspect, the invention provides a method for supplying pressurized air to an air consumer equipment of an aircraft, the method comprising:

providing an aircraft installation as defined in any of embodiments above;

receiving by the control unit an input relative to the aircraft operation condition; and operating the set of valves based on the received input, such that:

in taxiing and taking-off, the electrical compressor is fed only with cooling air from the cooling duct, so that the electrical compressor exclusively supplies compressed air to the air consumer equipment;

in climbing, the electrical compressor is fed only with cooling air from the cooling duct up to a pre-determined altitude, being the pre-determined altitude preferably 15000 ft; then, the air consumer equipment is directly fed by bleed air from the bleed duct (that is, without passing through the electrical compressor);

in cruise, the air consumer equipment is directly fed by bleed air from the bleed duct (that is, without passing through the electrical compressor); and in descending and holding above the pre-determined altitude, the electrical compressor is fed only with bleed air from the bleed duct, so that the electrical compressor exclusively supplies compressed air to the air consumer equipment; and in approaching and landing, the electrical compressor is fed only with cooling air from the cooling duct, so that the electrical compressor exclusively supplies compressed air to the air consumer equipment.

In a fifth inventive aspect, the invention provides a data processing apparatus comprising means for carrying out the method according to any of the embodiments of the fourth inventive aspect.

In a sixth inventive aspect, the invention provides a computer program comprising instructions which, when the program is executed by a computer, cause the computer to carry out the method according to any of the embodiments of the fourth inventive aspect.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 3a-b show an embodiment of an aircraft installation according to the present invention, in lateral and top view, respectively.

FIGS. 4a-b show an embodiment of an aircraft installation according to the present invention, in lateral and top view, respectively.

FIGS. 5a-b show an embodiment of an aircraft installation according to the present invention, in lateral and top view, respectively.

DETAILED DESCRIPTION OF THE PREFERRED EMBODIMENTS

As it will be appreciated by one skilled in the art, aspects of the present invention may be embodied as an aircraft installation, a pneumatic system, an aircraft, or a method for supplying pressurized air to an air consumer equipment.

Figure 1:
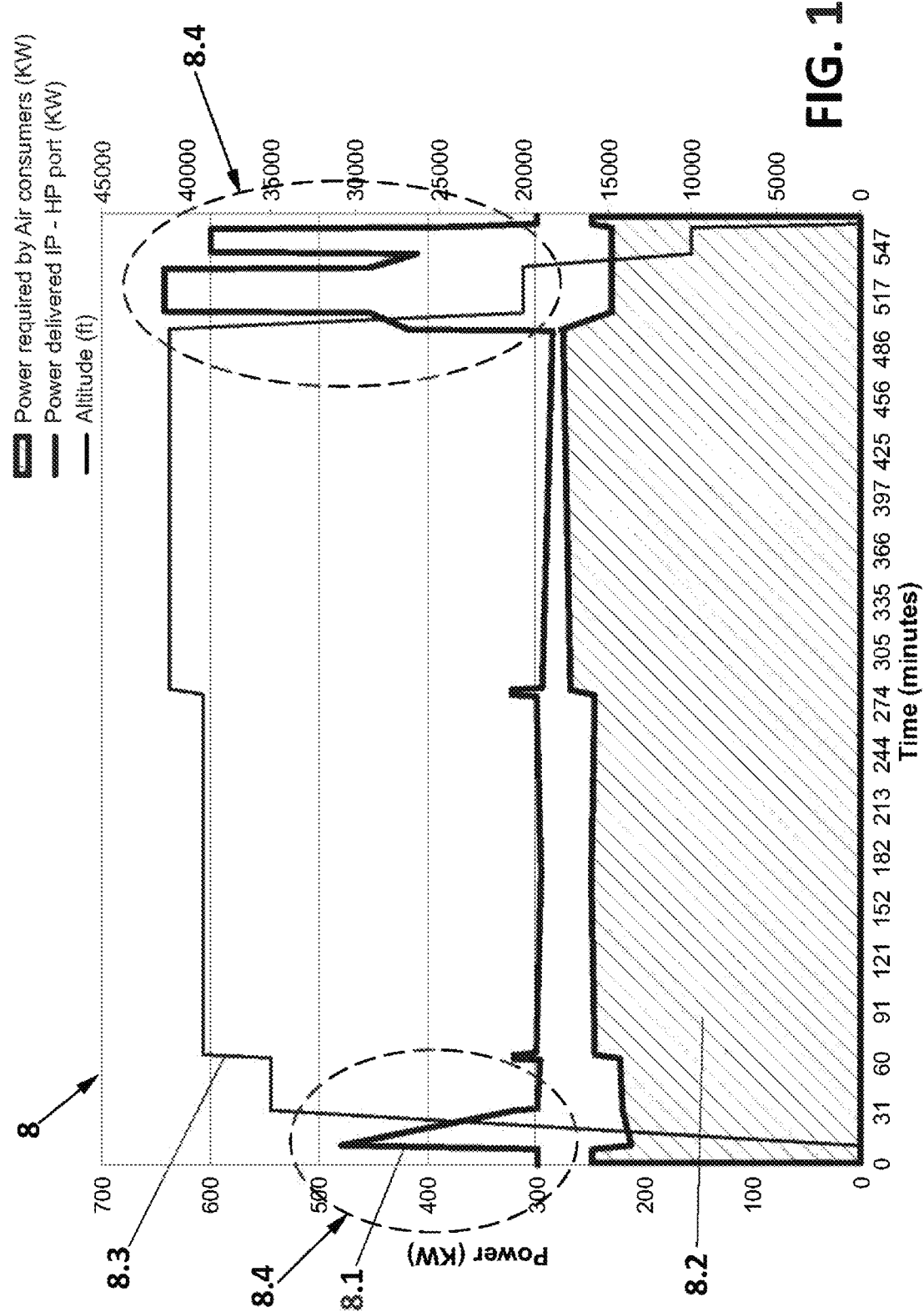
FIG. 1 shows a schematic graph of a conventional IP-HP air bleed system power delivering in comparison with power required by air consumers.

FIG. 1 depicts a schematic graph (8) of a conventional IP-HP air bleed system power delivering (8.1) in comparison with power required (8.2) by air consumers throughout a complete flight.

As it can be seen, the power required (8.2) by air consumers in kW is compared vs. the power delivered (8.1) by conventional IP-HP air bleed system (in kW). Superimposed to the former, there is an overview of the flight phases (8.3) through which aircraft passes in a complete flight, in particular taking altitude as a reference to place the aircraft in each of such flight phases.

In this exemplary mission profile, there is a mismatch between power supplied by the air bleed system and required by the air consumers both at the beginning and end of the flight, that is, in principle when aircraft is on-ground or close to it below a certain flight altitude.

Left-ordinate axis of the graph indicates power (in kW), while right-ordinate axis indicates flight altitude (in ft.). Finally, abscissa axis refers to flight time (in minutes).

Typical IP-HP air bleed system is conventionally designed as follows:

IP port extracts air during take-off, climbing, cruise, and holding; and

HP port extracts air on-ground, during descent and even holding if IP port is not capable of providing enough air pressure to meet air consumer requirements.

Therefore, in those phases where HP port is extracting air to supply air consumers, there is a significant energy loss as it can be seen by peaks (8.4) in the graph (selected by dashed circles). Those peaks (8.4) represent a power mismatch which entails an energy loss.

This energy loss is because:

The energy delivered (i.e., in terms of compressed or bleed air) by the HP port during 'holding' phase is significantly higher than the energy required by air consumers at that time. In other words, HP port is used under these conditions because the energy delivered by the IP port is not sufficient. On the other hand, the energy surplus not used is transmitted to the external air at the pre-cooler, thus increasing its temperature. This heated air is released directly into the atmosphere becoming a loss of energy for the engine while reducing the efficiency.

The energy delivered by the IP port during take-off and climb phases is significantly higher than the energy required to meet the requirements of the air consumers at that flight phases. Likewise, the energy surplus not used is transmitted to the external air at the pre-cooler, thus increasing its temperature. This heated air is again released directly into the atmosphere becoming a loss of energy for the engine while reducing its efficiency.

Figure 2A:
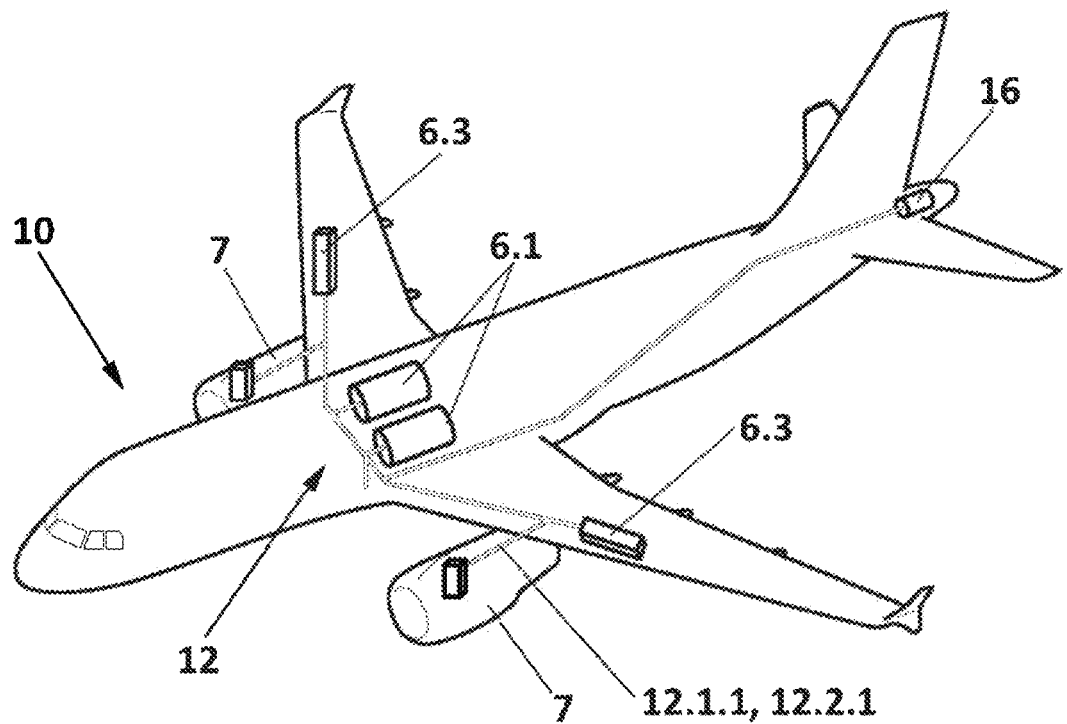
FIGS. 2a-b show a schematic representation of an aircraft comprising (a) a conventional pneumatic system, and (b) a pneumatic system according to the present invention.

FIG. 2a depicts a schematic representation of an aircraft comprising a conventional pneumatic system exclusively based on air bleed system (2).

In particular, the aircraft (10) comprises two turbofan engines (7), each hanging from a wing by respective pylons. It is schematically represented the ducting or channeling from the two ports, IP (2.1) and HP, coming from different compressor stages of the gas turbine engines of the turbofans. It is to be noted that valves and other hydraulic equipment are not shown through these figures.

It is shown that bleed ports (IP and HP) are in fluid communication (by channels or ducts (12.1.1, 12.2.1)) with WAIS (6.3) and Air Conditioning Packs (6.1) of the ECS in order to convey pressurized air thereto.

Furthermore, the aircraft (10) comprises an Auxiliary Power Unit ('APU') (16) at the tailcone of the aircraft (10). This APU (16) is also in fluid communication (by APU bleed ducting (16.1)) with the WAIS (6.3) and Air Conditioning Packs (6.1) of the ECS in order to provide either pneumatic or electrical energy thereto.

Typical APU bleed ducting (16.1) for pneumatic mode is also associated with OverHeat Detection System for safety reasons.

Figure 2B:
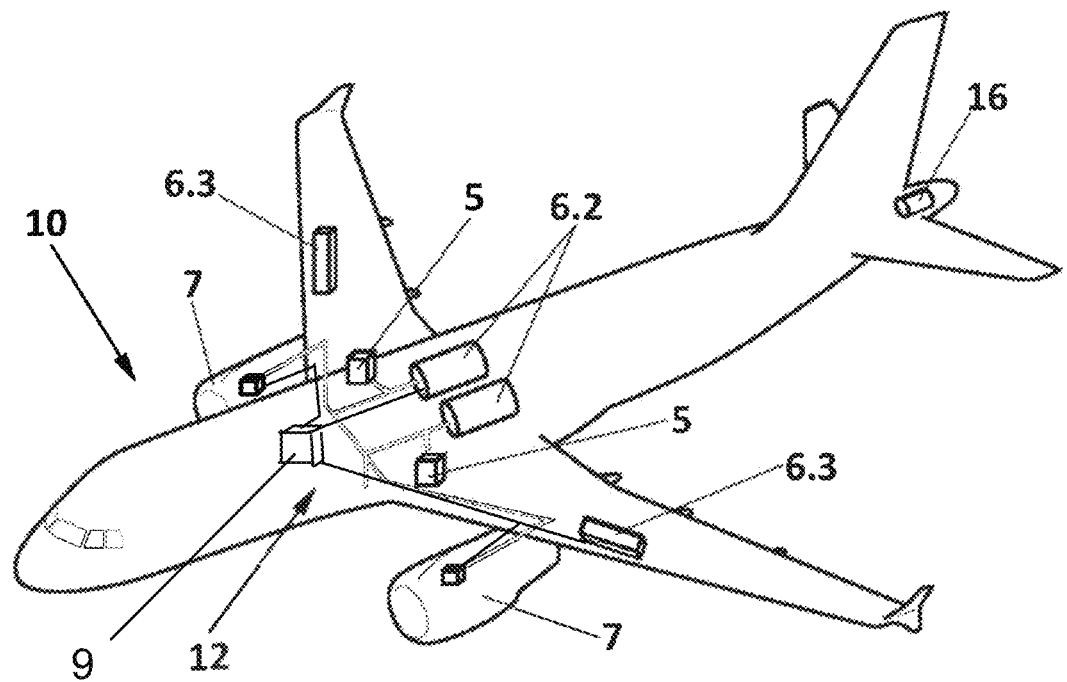

On the other hand, FIG. 2b depicts an example of a schematic representation of a similar aircraft (10) as the one shown in FIG. 2a but comprising a pneumatic system with an aircraft installation (1) according to the present invention.

Instead of IP-HP port for each turbofan engine as shown in FIG. 2a, the air bleed system (12) according to the present invention only extracts air from a single port, which is in fluid connection with the Air Conditioning Packs (6.1) of the ECS. In this particular embodiment, the Air Conditioning Packs are replaced by Vapor Cycle Machine Packs (6.2) which need lower air pressure in comparison with conventional Air Conditioning Packs (6.1).

Further, two electrical compressors (5) are positioned within the belly fairing of the aircraft (10) along with the Air Conditioning Packs or Vapor Cycle Machine Packs of the ECS.

In particular embodiments, the wing anti-ice system ('WAIS') may be electrical (6.4) so the ducting for conveying pressured air is no longer needed. Instead, wiring connections (which are lighter than ducts) should be deployed.

Similarly, APU bleed ducting (16.1) is deleted since pneumatic mode is no longer needed. Only electrical mode for supplying power to the electrical compressor (5), for instance, is envisaged. Besides, other power consumers such as batteries, electrical WAIS (6.4), or the like, may be supplied by the APU (16) running in electric mode or any other source.

Deletion of APU bleed ducting (16.1) (that is, APU only works in 'electrical mode') bring the following advantages along:

Significant weight reduction, around 170 kg. (in a short-range aircraft (10)).

Removal of the harmful installation of a high pressure and temperature duct running through the pressurized fuselage.

Deletion of OHDS associated to the APU ducting.

The formerly needed surplus of compressed air provided by the APU (16) is, within the present invention, exclusively provided by the air bleed system (12) through the single port (e.g., IP) after optimization and modelling works. This can be easily done by the person skilled in the art knowing temperature and pressure constraints of the aircraft installation of the pneumatic system, with the aim to meet air consumers (6) requirements acknowledged beforehand.

For example, the combination of electrical WAIS (6.4) and Vapor Cycle Machine Packs (6.2) in the ECS permits reducing by 2 or 3 compressor stages the location of the single port due to low pressure requirement of Vapor Cycle Machine packs above 15000 ft. (8 to 12 psig nominal conditions and up to 14 psig in failure cases).

It is to be noted that, although only WAIS (6.3, 6.4) and ECS (6.1, 6.2) are represented as air consumers (6), other minor air consumers may be used such as: fuel tank inerting system, engine starting system, water and waste, and/or hydraulic reservoirs pressurization.

Also, a control unit (controller 9) is electrically connected to some valves of the aircraft installation or the electrical compressor(s) itself to selectively operate them based on an aircraft (10) operational condition. Therefore, it is allowed that the bleed air coming from the single port or cooling air pass through, or be cut-off or the flow rate be reduced.

Figure 10:
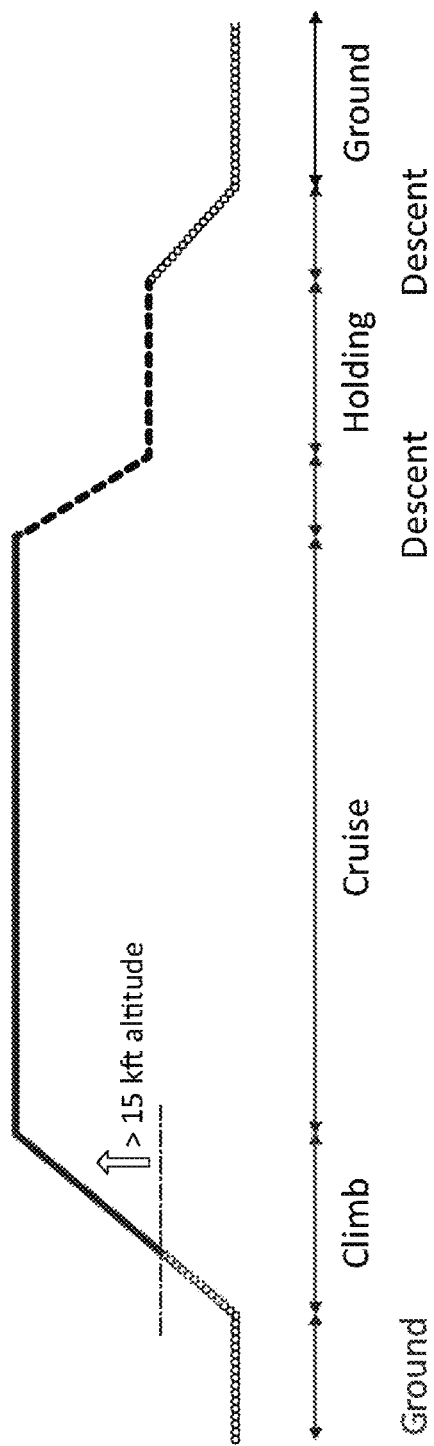
FIG. 10 shows a schematic representation of an aircraft mission profile using a hybrid solution for supplying compressed air according to the present invention throughout the flight phases.

Particularly, such aircraft (10) operation condition may be a pre-determined flight altitude, for instance 15000 ft., and/or any of the flight phases seen in FIG. 10.

FIGS. 3a and 3b depict a first embodiment of an aircraft installation according to the present invention, in lateral and top view, respectively. It is shown an aircraft installation (1) for supplying pressurized air to an air consumer equipment (6) of an aircraft (10). Particularly, the aircraft installation is arranged on top of the pylon (7.3), that is, the structure from which a turbofan engine (7) hangs from a wing.

The aircraft installation (1) comprises a bleed duct (2) in fluid communication at one end with a compressor stage of a gas turbine engine of the turbofan engine (7) via a single port (2.1), running through the pylon (7.3) and finally connected at opposite end with the air consumer (6) equipment.

As it was explained before, the single port (2.1) is a low-intermediate pressure port preferably located at the first half of the compressor stages of the compressor (not shown).

Taking the turbofan engine (7) coordinate system, where longitudinal axis is the rotation axis of the gas turbine engine (i.e., substantially parallel to the X-axis of the aircraft in body-axis), the bleed duct extends upwards following the foremost part of the pylon (7.3) up to the wing where it is deviated to the belly fairing of the aircraft (10).

In its path, the bleed duct (2) is intersected by a cooling duct (3) adapted to let cooling air enter therein. In this particular example, the cooling duct inlet (3.1) is immersed in the secondary zone of the turbofan engine (7), that is between the external nacelle (7.1) and the internal fairing (7.2) receiving air already compressed by the fan of the turbofan.

As it can be seen, the cooling duct inlet (3.1) is arranged so as to face the incoming cooling air entering into the cooling duct (3). In particular, this inlet is formed by an air scoop that permits regulating the flow rate entering the cooling duct.

Further, close to the inlet (3.1), the cooling duct (3) surrounds the abovementioned bleed duct (2) forming a thermal contact for exchanging heat. Passing such thermal contact point, the cooling duct (3) extends so as to reach the intake (5.1) of an electrical compressor (5).

The bleed air already cooled down may be diverted into a branch duct (4) that communicates such bleed duct (2) with the cooling duct (3) before the electrical compressor intake (5.1). Therefore, the electrical compressor (5) may receive air from the cooling duct which is either cooling air or bleed air (cooled down or not) diverted through the branch duct (4).

Alternatively, this diversion into the branch duct (4) may be done upstream such thermal point.

Finally, the outlet (5.2) of the electrical compressor (5) communicates with the bleed duct (2) to supply compressed air to the air consumer (6) equipment.

In the top view provided by FIG. 3b, it can be seen that the intake (5.1) of the electrical compressor is connected to the outlet (3.2) of the cooling duct after the joining of the branch duct (4) by a substantially 90° elbow. In other words, the cooling duct (3) has a 90° elbow which permits the outlet (5.2) of the electrical compressor to be properly aligned with the bleed duct (2).

At the outlet (5.2) of the electrical compressor (5), there may be a reverse flow protection valve.

Furthermore, from this FIG. 3b it can be seen the pylon (7.3) bifurcation, and particularly that the aircraft installation (1) is contained within the pylon (7.3) bifurcation, and from FIG. 3a that the installation is supported on the upper part of the pylon structure FIGS. 4a and 4b depict a second embodiment of an aircraft installation (1) according to the present invention, in lateral and top view, respectively.

This aircraft installation (1) only differs from the one shown in FIGS. 3a and 3b in that the intake (5.1) of the electrical compressor (5) is connected to the outlet (3.2) of the cooling duct (3) after the joining of the branch duct (4) by a substantially 45° elbow.

Therefore, when cooling air coming from the cooling duct (3) or bleed air diverted by the branch duct (4) passes by this 45° elbow instead by a 90° elbow that entails higher pressure losses, as consequence the pressure drop at that elbow is significantly lower, thus permitting to uphold the air conditions feeding the electrical compressor (5).

FIGS. 5a and 5b depict a third embodiment of an aircraft installation (1) according to the present invention, in lateral and top view, respectively This aircraft installation (1) only differs from the one shown in FIGS. 3a and 3b in that the inlet (3.1) of the cooling duct (i.e., the air scoop) is arranged so as to be angled relative to the incoming cooling air.

That is, the inlet instead of being frontal relative to the pylon bifurcation (7.3.1) (preferably the upper pylon bifurcation), is positioned in a lateral thereof. Therefore, as the upper pylon bifurcation (7.3.1) is substantially oblong, the inlet (3.1) is arranged on any of its opposite larger lateral areas.

Consequently, since the inlet (3.1) of the cooling duct (3) is arranged at a lateral of the upper pylon bifurcation (7.3.1), the cooling duct circumvents the bleed duct (2) and less thermal contact is provided there between.

The pylon bifurcation (7.3.1, 7.3.2) is the fairing located on the secondary flow area between the internal fairing and external nacelle that surrounds the pylon as well as the systems installed on the top.

It is to be noted that this embodiment shown in FIGS. 5a and 5b may comprise a 45° elbow duct connection alike FIGS. 4a and 4b.

Figure 6B:
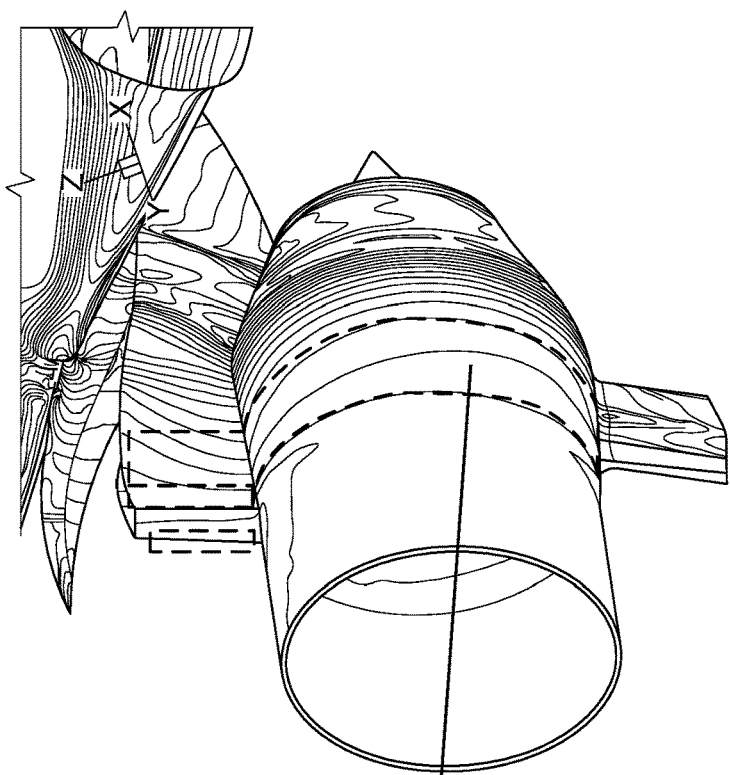
FIGS. 6a-b show an embodiment of an aircraft installation according to the present invention.
Figure 6A:
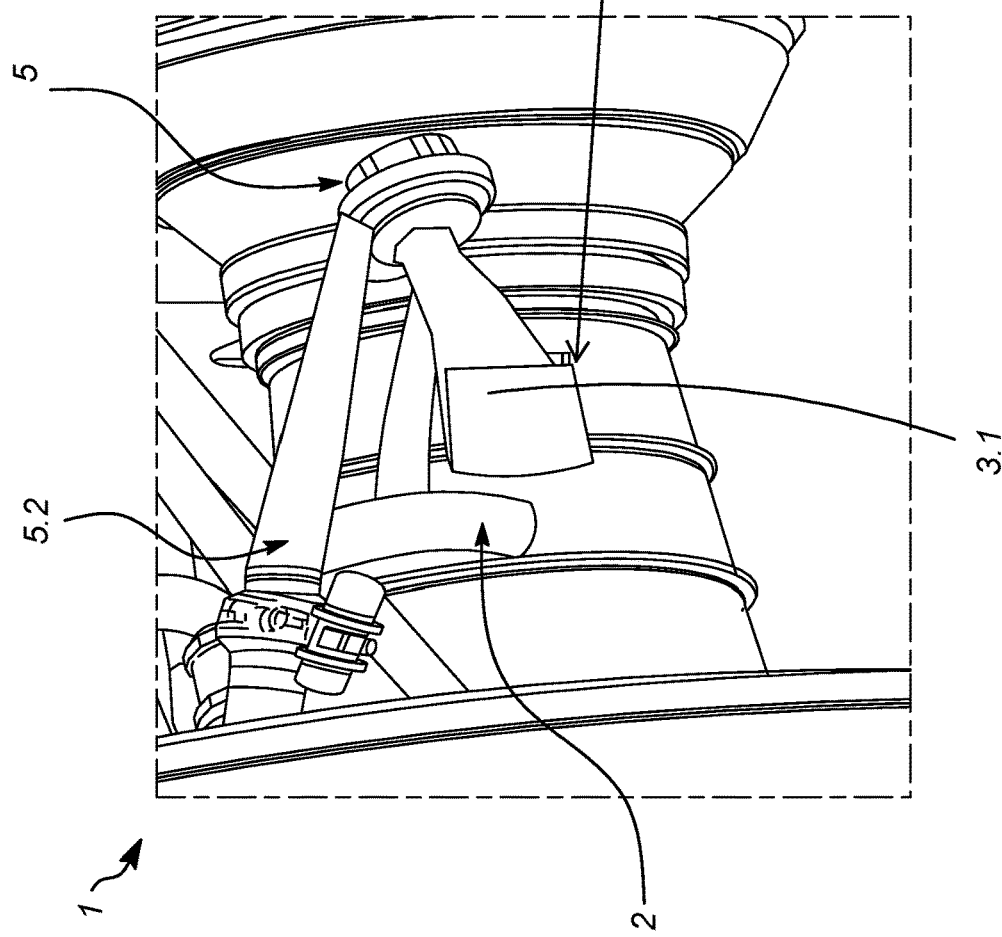

FIGS. 6a and 6b depict a fourth embodiment of an aircraft installation (1) according to the present invention. In particular, FIG. 6a depicts an aircraft installation (1) in a lateral view where neither the internal nacelle fairing (7.2) nor the external nacelle (7.1) of the turbofan (7) is shown.

In particular, the attachment between the front attachment of the pylon and the engine core may influence the position of the aircraft installation. Therefore, two options may be envisaged:

'fan case mounted' (upwards). That is, the aircraft installation may be positioned either in the bifurcation below the pylon, in the internal nacelle fairing, or in a combination thereof; or 'core mounted' (downwards). That is, the aircraft installation may be positioned up or within the internal nacelle fairing since the remainder space is occupied by the pylon itself.

For instance, throughout FIGS. 3 to 5, the pylon frontal part is attached to the engine core (option (ii)) so that the pylon structure is located on the lower part close to the engine core and the compressor. Thus, both the bleed and cooling ducting of the aircraft installation are positioned on top of the pylon structure (7.3).

Alternatively, on other engine attaching systems where the pylon frontal part is attached to the engine fan case (7.2), option (i), the pylon structure (7.3) is located on the upper part so that the compressor (5), bleed (2) and cooling (3) ducting are installed in below the pylon (7.3). In this case, the bleed duct (2) does not go through the pylon structure (7.3) before the compressor (5). Instead, it goes though the pylon structure (7.3) after the compressor (5).

Throughout this description, 'engine fan case' and 'internal nacelle fairing' (7.2) will be understand as equivalent terms.

Particularly in FIGS. 6a and 6b, regardless the attachment of the pylon, the aircraft installation is either inside the internal nacelle fairing or in the bifurcation (i.e., under the 'fan case mounted').

In particular, the aircraft installation (1) is positioned within the fairing (7.2) of the turbofan. Accordingly, the inlet (3.1) of the cooling duct (3) is arranged on a portion of a peripheral ring of the fairing (7.2) so that the cooling air entering the cooling duct comes from the fan.

In FIG. 6b, it is pointed out the peripheral ring on the fairing (7.2) where the inlet (3.1) of the cooling duct may be positioned. The size of the inlet may correspond, for instance, to the available size for the air scoop door to be opened within the fairing where such door opens outwards. Alternatively the air scoop door may be flush-type and therefore opens inwards.

Figure 7:
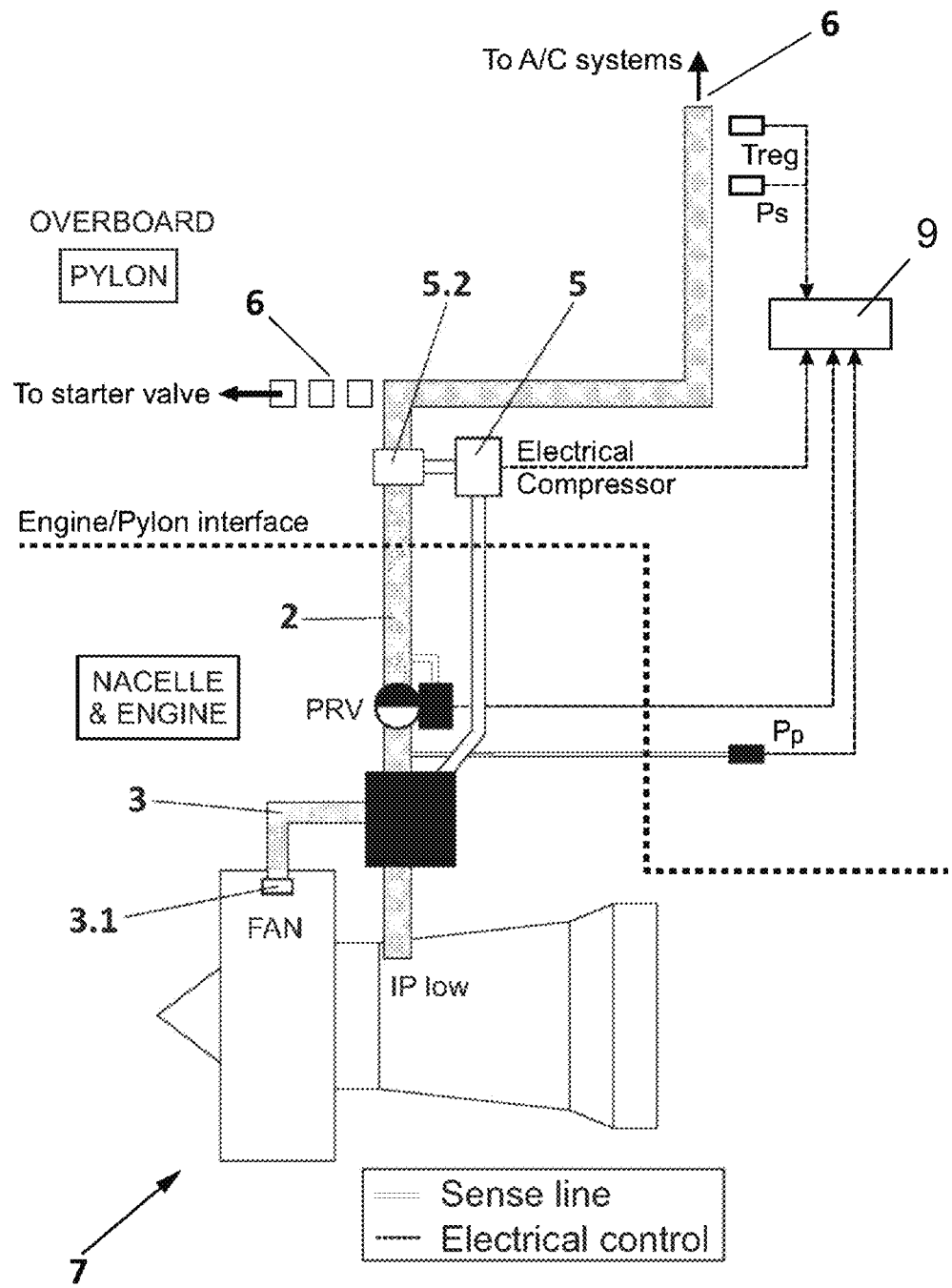
FIG. 7 shows a schematic architecture of a pneumatic system with an embodiment of an aircraft installation according to the present invention.

FIG. 7 depicts schematic architecture of a pneumatic system with an embodiment of an aircraft installation (1) according to the present invention. As an example, it may form the hydraulic scheme of the aircraft installation (1) shown in FIGS. 3 to 5. This may be also applicable to FIG. 6, considering that the electrical compressor is in the internal nacelle instead of on top of the pylon.

In particular, the single port (i.e., IP port) (2.1) of the bleed duct (2) is shown connected to a low-intermediate compressor stage of the gas turbine engine. Further, an additional port (3.1) coming from the fan connects with the cooling duct (3).

The intersection of the cooling duct (3) and the bleed duct (2) is schematically represented herein by a box, which may encompass different embodiments such as a thermal contact, etc. However, for illustrative purposes, the branch duct (4) is hidden by such a box.

From such box, a duct (in principle forming part of the cooling duct (3)) extends to the electrical compressor (5). Therefore, electrical compressor (5) may be fed by bleed air or cooling air as explained above.

Once compressed by the electrical compressor (5), air returns to the bleed duct (2) in order to be supplied to the air consumer (6) equipment such as ECS, WAIS, engine start valves, etc.

Furthermore, a dotted line represents the interface between gas turbine engine and pylon.

A pressure sensor located in the bleed duct after the box provides pressure information to a unit that further operates a pressure regulation valve located downstream.

Figure 8:
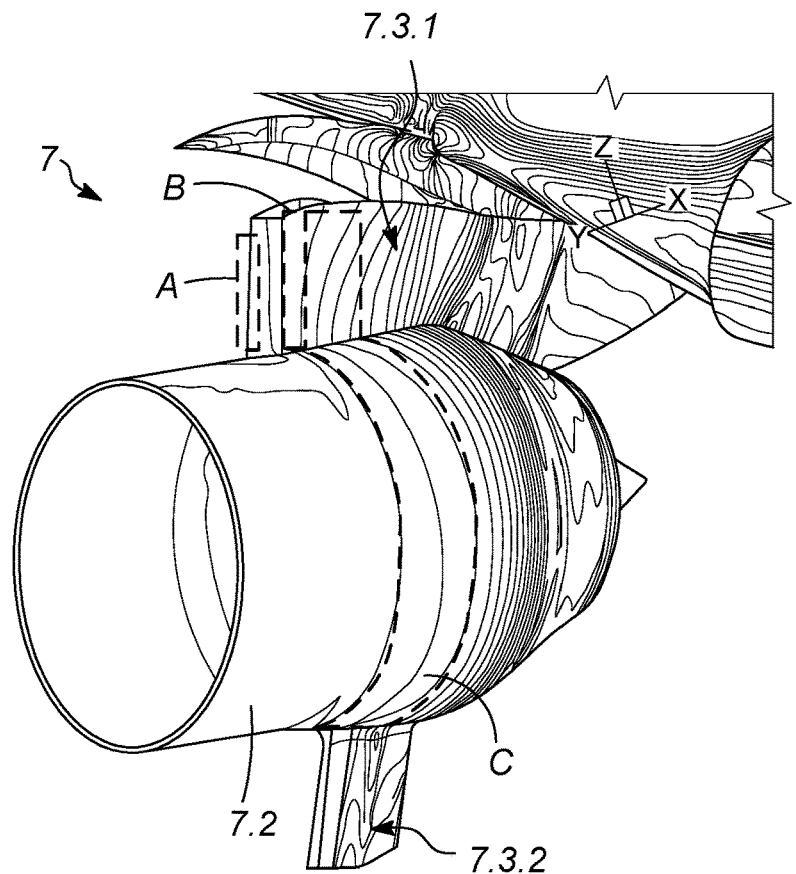
FIG. 8 shows the internal fairing of a turbofan engine, and the internal upper fairing that surrounds the pylon structure on the top part, the so-called upper bifurcation.

FIG. 8 depicts the internal nacelle fairing (7.2) of a turbofan engine (7) and the upper pylon bifurcation (7.3.1), with an aircraft installation (1) according to the present invention. It is to be noted that external nacelle (7.1) and fan are not shown in these figures for illustrative purposes.

In particular, the inlet (3.1) of the cooling duct (3) is shown arranged on the upper pylon bifurcation (7.3.1) or over internal nacelle fairing (7.2) itself. Suitable locations of a ram air intake (3.1) are pointed out therein (A—frontal-, B—lateral-, C—peripheral-). Final location mainly depends on local flow direction influenced by the aircraft (10) angle of attack.

The internal nacelle fairing (7.2) shown in FIG. 8 further connects with the external nacelle (7.1) via an upper (7.3.1) and lower pylon bifurcation (7.3.2).

Potential locations of the cooling duct inlet (3.1) are shown:

Possible installations on the pylon bifurcation (7.3.1):
at the foremost part of the upper pylon bifurcation (7.3.1) (frontal option);
so as to be angled relative to the incoming cooling air (lateral option);
Possible installation on the internal nacelle fairing (7.2):
on a portion of a peripheral ring of the fairing (7.2).

In a preferred embodiment for the installation on the upper pylon bifurcation (7.3.1), the cooling duct inlet (3.1) is arranged in the front part of the bifurcation ('frontal option'). This is a higher pressure area which improves inlet efficiency.

Briefly, the cooling duct inlet (3.1) may be located either on the front part of the upper pylon bifurcation (7.3.1) where the pressure is higher or on the lateral side (i.e., so as to be angled relative to the incoming cooling air) where the pressure is lower but enough.

Figure 9:
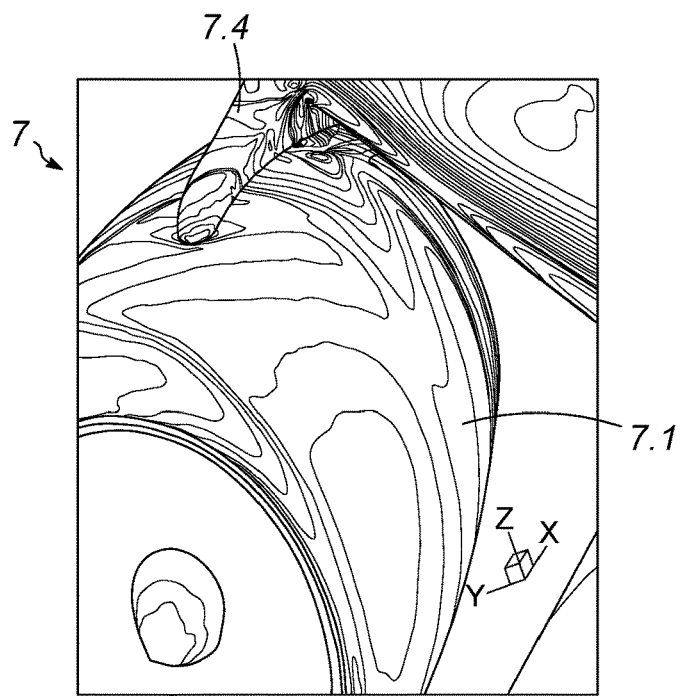
FIG. 9 shows the external nacelle of a turbofan engine, and the external upper fairing that surrounds the pylon structure on the top part between the external nacelle and the wing.

FIG. 9 depicts additional possible location for the cooling duct inlet (3.1) on the external nacelle (7.1) and on upper fairing (7.4) between the external nacelle (7.1) and the wing, where the available pressures are suitable for its installation.

The most suitable location for the cooling air outlet is on the upper part of the upper fairing (7.4).

FIG. 10 depicts an exemplary aircraft (10) mission profile using a hybrid solution according to the present invention for supplying compressed air throughout the flight phases.

If the air consumer (6) is fed directly with the bleed air extracted from the single port (2.1), it is represented by a continuous line. On the other hand, it is represented in dashed lines when the air consumer (6) is fed by air extracted via the single port (2.1) and further compressed by the electrical compressor (5). Also, it is represented in dotted lines when air consumer (6) is fed by cooling air of the cooling duct (3) and further compressed by the electrical compressor (5).

It is to be noted that, for illustrative purposes, no overlap between operation of the air bleed system (2) and operation of the at least one electrical compressor (5) (either supplied by cooling or bleed air) is shown, but this situation of overlap is of interest at the interphase when the compressed air source switches.

In particular, the criteria follow by the control unit (controller 9) to operate the air bleed system and/or the electrical compressor (5) upon receiving an aircraft (10) operation condition input (i.e., flight altitude or flight phase) is summarized as follows:

Below a pre-determined altitude, preferably 15000 ft.:
in taxiing and taking-off, the electrical compressor (5) is fed only with cooling air from the cooling duct (3), so that the electrical compressor (5) exclusively supplies compressed air to the air consumer equipment (6);
in climbing, the electrical compressor (5) continues exclusively supplying compressed air to the air consumer (6) equipment up to the pre-determined altitude;

Above the pre-determined altitude:
still in climbing, the air consumer equipment (6) is directly fed by bleed air from the bleed duct (2) (i.e., without passing through the electrical compressor);
in cruise, the air consumer (6) equipment continuous being directly fed by bleed air from the bleed duct (2) (i.e., without passing through the electrical compressor); and Once cruise phase ends:
in descending and holding still above the pre-determined altitude, the electrical compressor (5) is fed only with bleed air from the bleed duct (2), so that the electrical compressor (5) exclusively supplies compressed air to the air consumer (6) equipment; and Below the pre-determined altitude:
still in approaching or landing, the electrical compressor (5) is fed only with cooling air from the cooling duct (3), so that the electrical compressor (5) exclusively supplies compressed air to the air consumer (6) equipment.

In other words, as the aircraft (10) passes from one phase to another, a control unit (controller 9) receives the corresponding input and operates the corresponding valves or directly the electrical compressor (5), which affects the particular operation of a compressed air source.

As it was already mentioned, since air bleed system exclusively operates in favorable conditions from energy cost point of view (high altitude and relative high speed), the air bleed duct (2) together with the associated valves or regulators is sized according to cruise phase flight conditions, which encompasses the majority of the flight.

Energy-demanding flight phases such as on-ground operation, take-off, or even the first portion of climbing, as well as other phases like descent (or approaching) and holding relies exclusively in pressurized air supplied by the electrical compressor(s) (5).

Therefore, the electrical compressor(s) (5) adapts the delivered pressure to the required pressure by the air consumer (6) upon indication from the control unit (9).

Throughout the entire description, the person skilled in the art would recognize that specific figures of aircraft (10) operation, or parameters of air bleed systems highly depend on specifics of the aircraft (10) model.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft installation for supplying pressurized air to an air consumer equipment of an aircraft, the aircraft installation comprising:
   a gas turbine engine having a single port located at a low-intermediate compressor stage of such gas turbine engine;
   a bleed duct,
      at one end in fluid communication with the single port of the gas turbine engine, and
      at an opposite end in fluid communication with the air consumer equipment;
   a cooling duct comprising an inlet by which cooling air enters into the cooling duct, and an outlet;
   a branch duct in fluid communication with the bleed duct and configured to divert a portion of bleed air from the bleed duct into the outlet of the cooling duct; and
   an electrical compressor with an intake and an outlet, so that
      the intake is in fluid communication with the outlet of the cooling duct after the joining with the branch duct, and
      the outlet is in fluid communication with the bleed duct between the branch duct and the opposite end of the bleed duct which is communicated with the air consumer equipment.

2. The aircraft installation according to claim 1, wherein the inlet of the cooling duct is an air scoop arranged so as to substantially face the incoming cooling air entering into the cooling duct.

3. The aircraft installation according to claim 1, wherein the inlet of the cooling duct is an air scoop arranged so as to be angled relative to the incoming cooling air.

4. The aircraft installation according to claim 1, wherein the intake of the electrical compressor is connected to the outlet of the cooling duct after the joining of the branch duct by a substantially 90° elbow.

5. The aircraft installation according to claim 1, wherein the intake of the electrical compressor is connected to the outlet of the cooling duct after the joining of the branch duct by a substantially 45° elbow.

6. A turbofan engine comprising:
   a nacelle, and a fairing arranged internally to such nacelle for covering a gas turbine engine,
   a fan positioned in a foremost part of the nacelle and connected to the gas turbine engine by a shaft, wherein the fan extends up to a diameter of the nacelle; so that a secondary zone is formed between the nacelle and the fairing for passing cooling air from the fan;
   a pylon for hanging the entire turbofan engine from a wing of an aircraft; and
   an aircraft installation for supplying pressurized air to an air consumer equipment of the aircraft, wherein the aircraft installation is installed within the pylon, wherein the gas turbine engine has a single port located at a low-intermediate compressor stage of such gas turbine engine, and the aircraft installation comprises:
      a bleed duct,
         at one end in fluid communication with the single port of the gas turbine engine, and
         at an opposite end in fluid communication with the air consumer equipment;
      a cooling duct comprising an inlet by which cooling air enters into the cooling duct, and an outlet;
      a branch duct in fluid communication with the bleed duct and configured to divert a portion of bleed air from the bleed duct into the outlet of the cooling duct; and
      an electrical compressor with an intake and an outlet, so that
         the intake is in fluid communication with the outlet of the cooling duct after the joining with the branch duct, and
         the outlet is in fluid communication with the bleed duct between the branch duct and the opposite end of the bleed duct which is communicated with the air consumer equipment.

7. The turbofan according to claim 6,
   wherein the inlet of the cooling duct is an air scoop arranged so as to substantially face the incoming cooling air entering into the cooling duct;
   wherein the inlet of the cooling duct is arranged at the foremost part of a pylon bifurcation within the secondary zone formed between the nacelle and the fairing so that the cooling air entering the cooling duct comes from the fan.

8. The turbofan according to claim 7,
   wherein the pylon is covered by an upper fairing between the external nacelle and the wing, and
   wherein the inlet of the cooling duct is arranged on such upper fairing by a ram air intake.

9. The turbofan according to claim 6,
   wherein the inlet of the cooling duct is an air scoop arranged so as to be angled relative to the incoming cooling air;
   wherein the inlet of the cooling duct is arranged angled relative to the incoming cooling air on a pylon bifurcation within the secondary zone formed between the nacelle and the fairing so that the cooling air entering the cooling duct comes from the fan.

10. The turbofan according to claim 6, wherein the inlet of the cooling duct is arranged on a portion of a peripheral ring of the fairing so that the cooling air entering the cooling duct comes from the fan.

11. The turbofan according to claim 6, wherein the inlet of the cooling duct is arranged on the nacelle by a ram air intake.

12. An aircraft comprising at least one turbofan engine according to claim 6, wherein the aircraft further comprises a vapor cycle machine as the air consumer equipment.

* * * * *